J. RICH.
VARNISH-FILTER.
No. 173,559. Patented Feb. 15, 1876.
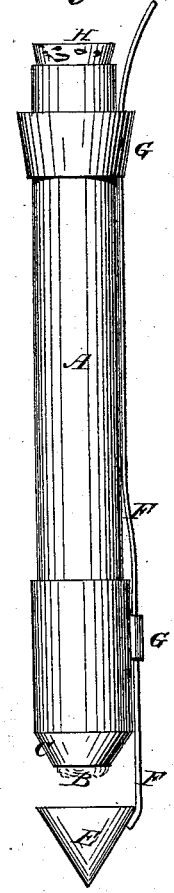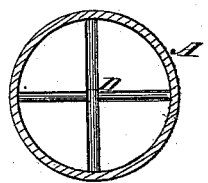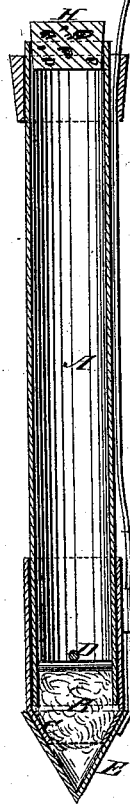
WITNESSES:
Francis McArdle
John Goethals
INVENTOR:
J. Rich
BY
ATTORNEYS.

UNITED STATES PATENT OFFICE.

JEROME RICH, OF JACKSON, MICHIGAN.

IMPROVEMENT IN VARNISH-FILTERS.

Specification forming part of Letters Patent No. 173,559, dated February 15, 1876; application filed January 17, 1876.

*To all whom it may concern:*

Be it known that I, JEROME RICH, of Jackson, in the county of Jackson and State of Michigan, have invented a new and Improved Varnish-Filter, of which the following is a specification:

My invention consists of a tube in the bottom of which is a sponge, cotton-waste, or other filter suitable for filtering the dust out of carriage-varnish, and below the lower end, which is conical, is a conical cup-valve, attached to a rod sliding up and down the tube, to close the filter to prevent any gum or skins from entering it as it passes down to the bottom of the can for filling, also to open the filter and let the varnish in from the bottom of the can, the varnish to be drawn from the filter by a liquor-thief, the filtering-tube to remain in the can, and to be corked at the top to protect the varnish from the dust of the atmosphere, which falls into it while being used from an open vessel in the common way, which makes a sandy and rough appearance of the finish.

Figure 1 is a side elevation of my improved filter. Fig. 2 is a sectional elevation, and Fig. 3 is a transverse section.

Similar letters of reference indicate corresponding parts.

A is the tube, in the bottom of which is a little filter of sponge, cotton-waste, or other like material, B, retained by a conical contraction, C, below, and cross-wires D above. E is the cup-valve, fitted on the rod F, so as to be pulled up and close the tube when required, the rod being confined to the tube by guides G, so as to slide freely up and down. The top of the filter is closed by a cork, H, when it is desired to retain the varnish.

The varnish commonly contains more or less dust, and is poured out of the can into an open vessel in supplies to last for some time, and it accumulates dust from the atmosphere very fast, which very seriously injures the quality of the finish.

By the use of this filter the varnish can be readily taken out of the can, and the supplies for use can be obtained oftener, and in smaller quantities, with less labor, than they can from the can, so that much better work can be done.

Having thus described my invention, I claim as new and desire to secure by Letters Patent—

The improved varnish-filter, consisting of tube A, with contracted end C and cross bars D, filtering material B, cup-valve E, and sliding rod F, substantially as specified.

JEROME RICH.

Witnesses:
Z. W. WALDRON,
J. E. SPARKS.